Sept. 25, 1956 I. HELLER 2,764,631

TELEPHONE SYSTEM

Filed April 15, 1955 3 Sheets-Sheet 1

INVENTOR.
Isaac Heller,
BY
Harry Bulook
ATTORNEY

Sept. 25, 1956 I. HELLER 2,764,631
TELEPHONE SYSTEM
Filed April 15, 1955 3 Sheets-Sheet 2
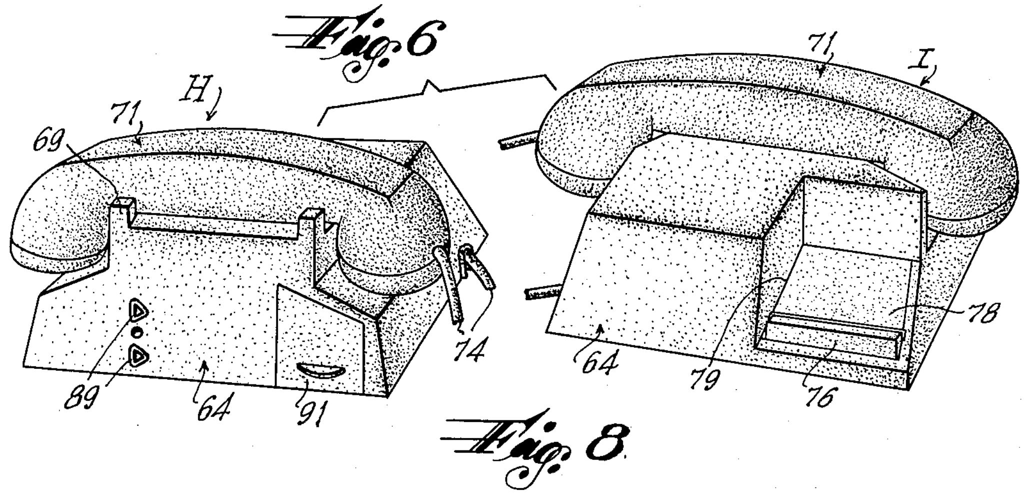
Fig. 6
Fig. 8
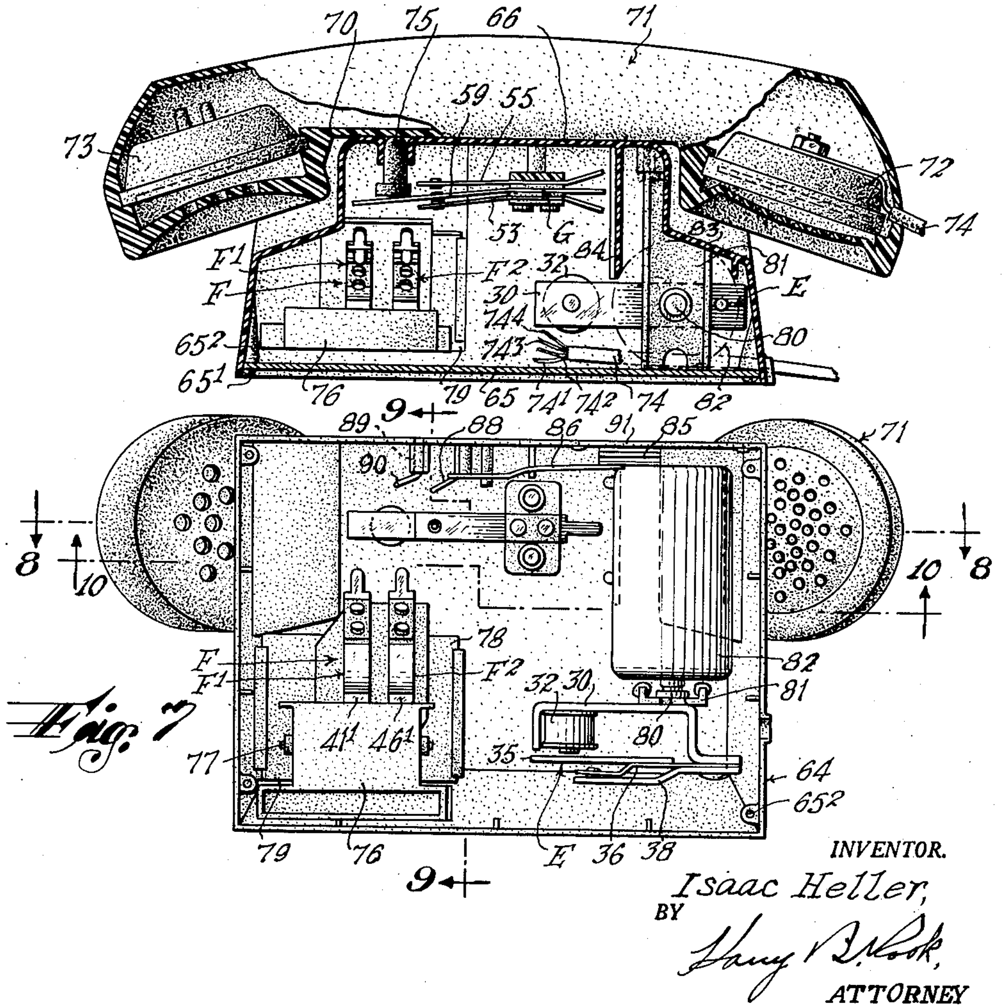
Fig. 8, Fig. 7
INVENTOR.
Isaac Heller,
BY
Harry B. Rook,
ATTORNEY

TELEPHONE SYSTEM

Filed April 15, 1955 3 Sheets-Sheet 3

INVENTOR.
Isaac Heller,
BY
Harry Belook,
ATTORNEY

United States Patent Office 2,764,631
Patented Sept. 25, 1956

2,764,631

TELEPHONE SYSTEM

Isaac Heller, Maplewood, N. J., assignor to Robin Hood Co., Newark, N. J., a corporation of New Jersey Application April 15, 1955, Serial No. 501,474
9 Claims. (Cl. 179—1)

This invention contemplates a telephone system of the type that comprises two identical handsets each incorporating a microphone, a receiver, a signal such as a buzzer, a power source such as a flashlight battery, appropriate circuit wires and switches, said handsets being connected by a two-wire transmission line so that two persons can signal and converse with each other over a distance of many feet, for example, from distantly separated rooms in a house.

The invention is also directed to the provision of a telephone system which comprises two handsets each of which contains only a microphone and a receiver and is associated with a cradle or base upon which the handset normally rests when not in use and which contains a buzzer or other signal, a battery, circuit wires and switches, said microphones and receivers of the handsets being connected to the electrical parts in their respective bases by wires and the parts in each base being connected to the parts in the other base by only a two-wire transmission line to permit signaling and communication between the two handsets.

It is, of course, desirable that telephone systems of the general character above described shall be of minimum weight and inexpensive, and therefore a primary object of the invention is to provide such a telephone system embodying novel electrical and mechanical features whereby the electric power shall be economically used and the power source can be small, for example, one flashlight cell in each handset.

The invention is also related to telephone systems wherein each handset or each base, as the case may be, has a switch to cause actuation of the signal of the other handset or base; and another object is to provide such a telephone system in which, when a handset is not in use, the potential of the battery in one handset or in one base opposes or bucks the potential of the battery in the other handset or base, so that no current can flow and so as to avoid waste of electric power, and when the signal controlling switch in either handset or in either base is closed, both batteries are thrown into series circuit so that their potentials are combined to operate the signal and thereby permit such operation over long distances, with only two transmission wires required.

It is another object of the invention to provide such a telephone system wherein each handset or each base shall have circuit wires and a switch to be closed at the same time as the corresponding switch in the other handset or base for connecting the two receivers in parallel circuit and at the same time connect the receiver and microphone of each handset in series circuit with each other and the corresponding battery and disconnect the buzzer coil from the circuit.

Other objects are to provide a novel and improved simple construction, combination and arrangement of casings for the handset and for the base, buzzer, switches, batteries and other parts; and to obtain additional advantages and results that will be brought out by the following description in conjunction with the accompanying drawings in which Figure 1 is a composite perspective view of two telephone handsets embodying the present invention and the connecting wires between said handsets, showing the plug at one end of the connecting wires detached from the corresponding handset, one handset being viewed from the front thereof and the other handset being observed from the rear thereof;

Figure 6 is a composite perspective view of two telephone handsets and their associated bases, one of the bases being viewed from the rear and the other base being observed from the front thereof;

Figure 7 is a bottom plan view of one of the bases and its handset with the bottom cover plate removed;

Figure 8 is a vertical longitudinal sectional view approximately on the plane of the line 8—8 of Figure 7, with the base in upright position and with the battery shown by broken lines;

Figure 1:
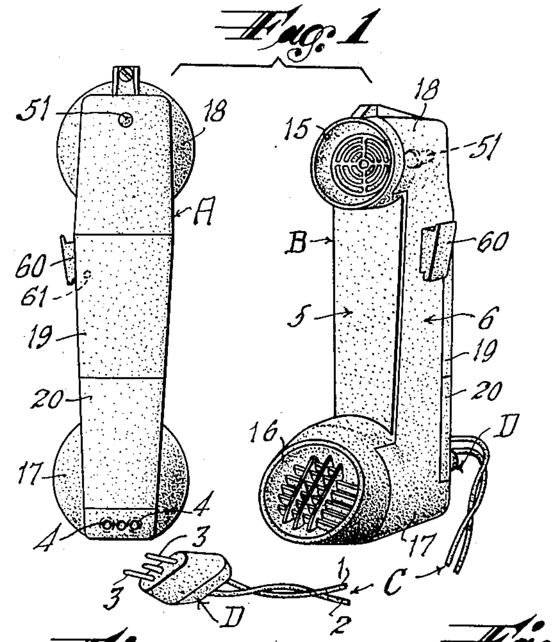

Specifically describing the embodiment of the invention shown in Figures 1 to 5 inclusive, the reference characters A and B generally designate two telephone handsets which are identical and are separably connected by a transmission line C that is shown as comprising two wires 1 and 2 that are preferably twisted together for convenience and have connected thereto at their opposite ends plug connectors D each of which includes a pin connector 3 connected to one of said wires and adapted to be separably plugged into connector sockets 4 in the respective handset for electrically connecting the two handsets.

Each handset includes a front section generally designated 5 and rear section generally designated 6, said sections being preferably moulded from a suitable material such as Bakelite or a synthetic composition that desirably serves also as electrical insulation. The front section 5 includes two recessed portions 7 and 8 in which are mounted respectively a microphone or telephonic transmitter 9 and a telephonic receiver 10 of generally known construction. The microphone may include the usual sound responsive diaphragm 11 and a container 12 for compressible carbon particles while the receiver is shown as comprising a sound responsive diaphragm 13 and the usual coils and iron cores 14. The earpiece 15 and the mouthpiece 16 preferably are moulded integrally with the front section and the rear section 6 has cup-shaped portions 17 and 18 complemental to the recessed portions 7 and 8 of the front section for housing the microphone and receiver and other parts about to be described, said rear section also having an opening normally closed by a removable cover for easy access to the parts within the casing, said cover comprising two channel shaped sections 19 and 20 each of which has rabbitted edge portions 21 to seat upon the edges of the opening in the front section and each of which has one end separably connected at 22 with the corresponding end of the opening in the front section, while the other end of one of the cover sections overlaps the juxtaposed end of the other cover section as indicated at 23 and one of the cover sections has inherently resilient hooked lugs 20[1] to snap into releasably locking relation with ribs 20[2] on the side walls of the front section.

The front section also has a seat 24 for a flashlight battery cell 25 which can be inserted into and removed from the casing when the cover section 20 is removed. Preferably moulded integrally with the casing of the microphone is a post 26 against the end of which the rear casing section abuts when the two sections are connected, and in this post are arranged the socket terminal connectors 4 that are shown as comprising resilient sleeves having integral lateral terminal ears 27 to which wires are connected, the rear casing section having openings registering with said socket connectors for the reception of the plug pins 3.

One of the battery terminals is shown as comprising a spring arm 28 directly connected to one terminal 63 of the microphone, while the other battery terminal comprises a spring arm 29 fastened at 30 to the inner side of the front casing section and having a portion projecting in spaced parallel relation to the spring arm 28 so that the battery can be held with its negative and positive terminals in contact with the respective arms 28 and 29.

Figures 2, 4, 5:
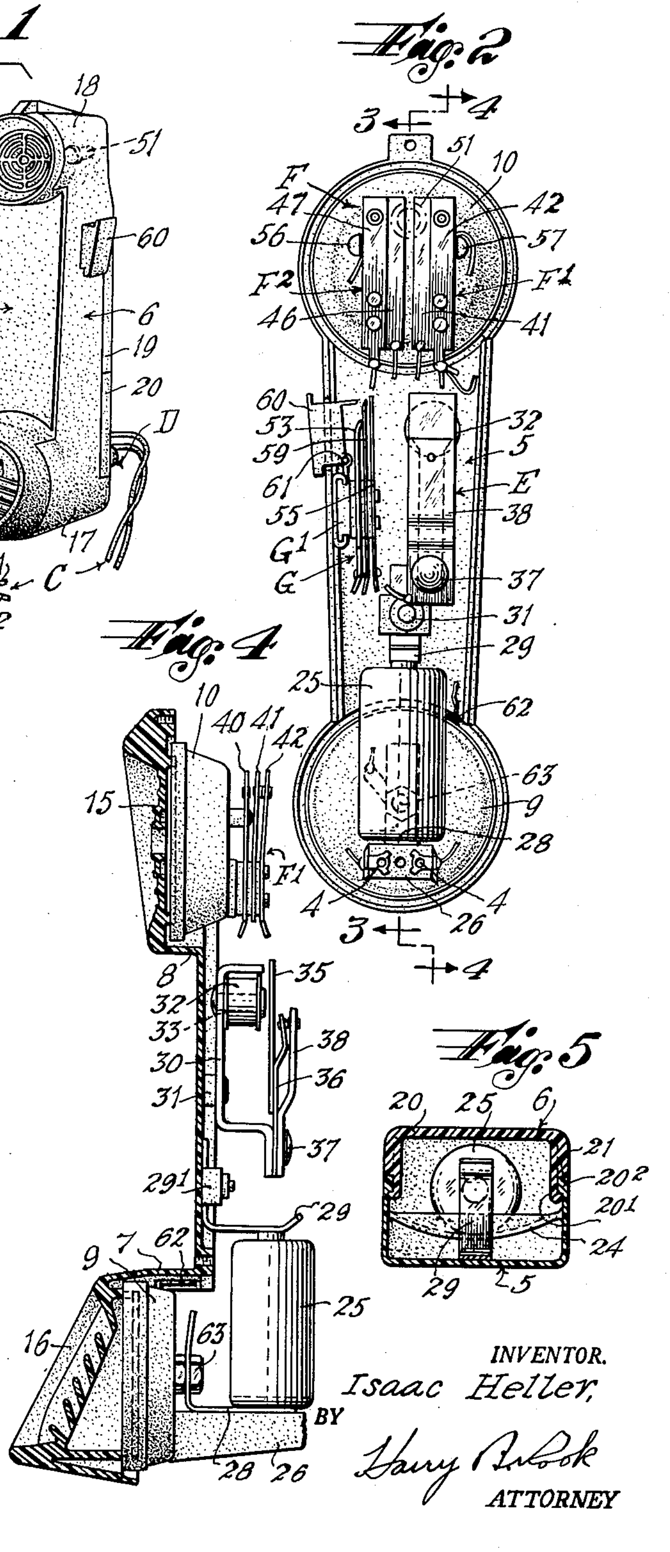
Figure 2 is an enlarged plan view of one of the handsets with the rear section of the casing removed.
Figure 4 is a similar view approximately on the plane of the line 4—4 of Figure 2 and with the rear section of the casing omitted.
Figure 5 is a transverse sectional view approximately on the plane of the line 5—5 of Figure 3.

A signaling device, in the present instance a generally known type of buzzer E, is shown as comprising a main support bracket 30 rigidly mounted at 31 on the front casing section and having mounted thereon the usual wire coil 32 and metallic core 33 which is shown as comprising the rivet by which the coil is attached to the bracket. Cooperating with the coil is an armature 35 that has one end connected by a spring strip 36 to an arm on the bracket 30 as indicated at 37 on which is also mounted a buzzer contact element 38 with which a free end of the spring strip 36 normally contacts as shown in Figure 4.

In accordance with the invention, a buzzer switch F is provided to permit the user of either handset to cause actuation or energization of the buzzer in the other handset to signal the user of the second mentioned handset that the user of the first mentioned handset wishes to converse, and a second switch generally designated G is provided in each handset to be manually actuated by the users of both handsets when it is desired to communicate between the two handsets through the microphones and receivers and over the transmission line C.

As shown, the buzzer switch comprises two sections $F^1$ and $F^2$. The section $F^1$ includes lower, intermediate and upper spring contact strips 40, 41 and 42 respectively, that have their corresponding ends rigidly connected to the receiver casing in insulated relation to each other. Referring to the wiring diagram of Figure 11, the lower contact 40 is connected by a wire 43 to the negative terminal of the battery cell 25 while the upper contact 42 is connected by a wire 44 to the positive terminal of the battery. The intermediate contact 41 is connected to one of the socket connectors 4 and thence by one of the transmission wires 1 and 2 to the intermediate contact 41 of the switch $F^1$ of the other handset.

The section $F^2$ of each buzzer switch includes lower, intermediate and upper spring contacts 45, 46 and 47 respectively, that also are connected at one end to the receiver casing in insulated relation to each other. The lower contact 45 is connected by wires 48 to the upper contact 42 of the switch section $F^1$ while the upper contact 47 is connected by wires 49 and 50 to one terminal of the microphone 9, the other terminal 63 of the microphone being connected to the negative terminal of the battery

25 by spring arm 28 and to one terminal of the buzzer coil by a wire 34 that is connected to said spring arm. The intermediate contact strip 46 is connected to the socket connector 4 and thus to the other transmission wire and thereby to the intermediate contact 46 of the other handset. The intermediate contacts of the two switch sections $F^1$ and $F^2$ are normally held by their inherent resiliency in contact with the upper contact strips of the respective switches, and they are intended to be actuated simultaneously into engagement with the lower contacts of the respective switches. As shown, the two intermediate contact strips are wider than the other contact strips and extend toward each other as best shown in Figure 2, and a buzz button 51 is slidably mounted in the rear casing section 6 to simultaneously engage the extensions of said intermediate contact strips as indicated by broken lines in Figure 2 so that pressure upon the push button will force the intermediate contacts of the two switch sections into engagement with the lower contacts and out of engagement with the upper contacts of the respective switch sections.

The "talk" switch G includes a main substantially rigid contact strip 53 that is connected by a wire 54 to the buzzer contact 38. The talk switch also includes a contact strip 55 that is connected to one terminal 56 of the receiver 10, the other terminal 57 of which is connected by a wire 58 to the upper contact strip 42 of the switch section $F^1$. The talk switch also has an intermediate spring contact strip 59 that is connected to the junction of the wires 50 and 49 that lead respectively to the terminal 62 of the microphone and to the upper contact element of the buzz switch section $F^2$. This contact strip 59 is normally held by its inherent resiliency in engagement with the rigid contact strip 53 and is adapted to be pressed into engagement with the other contact strip 55 by a manually operable lever 60 that is pivotally mounted at one end by trunnions 61 that are seated in pivot recesses in the respective front and rear casing sections. The three strips 53, 55 and 59 are mounted intermediate their ends in insulated relation to each other on a post $G^1$ projecting from the inside of the front cover section. This intermediate contact strip of the talk switch is connected to the same terminal 62 of the microphone to which the upper contact strip 47 of the buzz switch section $F^2$ is connected. The other terminal 63 of the microphone is connected to one terminal of the coil 32 of the buzzer, the other terminal of which is connected to the armature 35 that is normally in electrical contact with the buzzer contact 38.

It will thus be seen that in normal non-operating use, the batteries 25 in both handsets are connected in series circuit with the buzzers in both handsets but in such a manner that the potential of each battery opposes or bucks the potential of the other battery, thus allowing no current to flow anywhere in the circuit. When the push button 51 in the calling handset is pressed, the intermediate contacts 41 and 46 are simultaneously actuated into engagement with their respective lower contacts 40 and 45 so as to disconnect from the circuit the buzzer of the calling handset and at the same time reverse the potential of said battery so as to connect the batteries of both handsets in series circuit with each other and with the buzzer in the called handset so that the battery potentials aid or combine with each other to energize the buzzer in the called handset. In other words, the potential applied to the buzzer in the called phone is equal to the sum of the two battery potentials. When the push button 51 conveniently termed the buzz button is released, the circuit in the handset is returned to normal condition, namely, with the potential of its battery bucking the potential of the battery in the called handset.

In the normal non-operating position of the "talk" lever 60 in each handset, the buzzer coil and contacts are in effect in parallel circuit with the microphone. The microphone is of considerably higher impedance than the coil of the buzzer so that this shunting effect has no effect on the buzzing qualities of the buzzer. For example, the buzzer coil impedance is approximately three ohms while the impedance of the microphone is approximately 75 ohms and the receiver impedance is approximately 10 ohms.

When the two persons holding the handsets desire to converse, the buzz button 51 must be released, and the talk lever 60 in each handset must be pressed whereupon the buzzer coil in each handset is disconnected from the circuit and the microphone is connected in series with the battery and the receiver. The potentials developed in the receiver by the effect of the sound of the voice on the microphone are applied to the transmission wires 1 and 2 through the contact elements of the buzzer switch F which are in their normal (no buzz) condition as shown in the wiring diagram of Figure 11. Therefore, so long as the two receivers are connected in parallel by the transmission lines 1 and 2 by pressing both talk switch levers, both receivers will react to the potentials corresponding to the voice as created in the microphones of both handsets.

It will be noted that the talk switch levers in both handsets must be pressed simultaneously and continuously throughout the time it is desired to carry on a conversation in order to maintain engagement of the contact strip 59 with the contact strip 55, and that when the circuit is in this condition, the battery in each handset will be powering the microphone and the receiver in its own handset; and that inasmuch as the receivers are at the same time connected in parallel by the transmission lines 1 and 2, the voice potentials developed across one receiver coil will be heard in the other receiver.

It will be noted that both handsets are wired alike in every respect and that the transmission lines which connect the two handsets must be connected in such a manner as to cause the battery in each handset to buck the battery in the other handset in the non-use condition. If by mistake, the transmission line is reversed when one of the plugs D is connected to the socket connectors 4, the two batteries will be in series aiding each other rather than bucking each other, thus causing both buzzers to sound weakly. The difficulty can be overcome by simply removing one of the plugs D and reinserting it with each of the pins in the socket connector 4 opposite that in which the pin was originally inserted.

Figures 6 to 10 inclusive illustrate the form of the invention that includes a pair of identical telephonic units H and I each of which comprises a handset and a stand for the handset. The electrical circuit for this form of the invention is identical with the circuit hereinbefore described and illustrated in Figure 11, but only the microphones and receivers are in the handsets, the other parts of the circuit being enclosed within the stands or bases; and the intermediate contact strip of the talk switch is normally positively actuated into "no-talk" position by the weight of the handset pressing against a push button, instead of the intermediate contact strip being normally urged into its no-talk position by its inherent resiliency as in the form of the invention shown in Figures 1 to 5 inclusive. Each of the two identical units or combinations H and I comprises an inverted box-like base 64 which has its bottom end normally closed by a cover plate 65 that is secured in position by screws 65¹ fitted into screw threaded bosses 65² on the walls of the bases. The top wall of each base includes a flat portion 66 disposed between a coping 68 and lugs 69 against which the front section 70 of the corresponding handset may rest. Each handset includes a casing 71 at one end of which is a microphone 72 and at the other end of which is a receiver 73, which may be identical with the microphone and receiver 9 and 10 hereinbefore described. The microphone and receiver are connected in circuit in known way with four wires 74¹, 74², 74³ and 74⁴ that are led out of the casing in the form of a cord 74 and into the base 64.

Wire 74¹ connects one terminal of the receiver to the upper contact of section F¹ of buzz switch. Wire 74² connects the other receiver terminal to the fixed contact 55 of the talk switch. Wire 74³ connects one terminal of the microphone to one terminal of the buzzer. Wire 74⁴ connects the other terminal of the microphone to the upper contact of section F² of the buzz switch. The intermediate contact strip 59 of the talk switch is normally engaged by a talk switch button 75 that corresponds in function to the talk switch lever 60 but is slidably mounted in an opening in the top wall 66 of the base so as to be pressed downwardly into engagement with the contact strip 53 when the handset is in non-use position on the base as shown in Figures 6 and 8. When the handset is removed from the base the inherent resiliency of the strip urges it into engagement with the contact 55 so as to close the talk circuit as shown in Figure 10.

Instead of the push button 51 for actuating the buzzer switch F, a switch lever 76 is pivotally mounted intermediate its ends at 77 on a plate 78 that partially closes an opening 79 in the upper surface of the base. One end of the lever engages extensions 41¹ and 46¹ of the corresponding intermediate contact strips of the buzz switch sections F¹ and F² respectively, while the other end of the lever projects upwardly through the opening 79 at the edge of the plate 78, providing a fingerpiece for operating the lever. As shown, in this form of the invention, the talk switch G is mounted on the inside of the upper wall 66 of the base, while the buzz switch is mounted on the plate 78.

Figure 3:
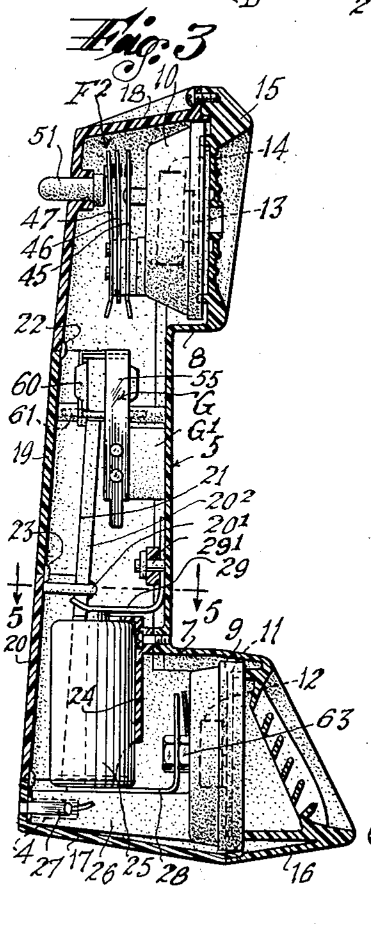
Figure 3 is a longitudinal vertical sectional view through the whole handset taken approximately on the plane of the line 3—3 of Figure 2.

The buzzer E is identical in construction with the buzzer shown in Figures 2 to 4 inclusive but instead of being mounted directly on the casing wall it is secured by a rivet 80 to an arm 81 that projects from the upper wall 66 of the base, said rivet serving as one contact for engagement with the positive terminal of the battery 82. The battery rests upon the bottom cover 65 between one side wall 83 of the base and a partition 84 inside the base, and the negative terminal of the battery engages a spring contact strip 85 that is secured at one end to the rear wall of the base and has its other end frictionally contacting with a terminal strip 86 one end of which is secured to the base at 87 and has a terminal connector 88 for a wire. In the rear wall of the base is also provided a pair of socket connectors 89 that comprise spring sleeves fitted in recesses in the base and having terminal extensions 90 for the connection of wires thereto. These socket connectors 89 are adapted to receive the pins 3 of one of the plugs D on the end of the transmission line C, it being understood that one of the plugs D at one end of the transmission line will be connected to the base 64 of one combination H of base and handset while the other plug D will be connected to the base 64 of the other combination I of base and handset.

Figures 9, 10, 11, 12:
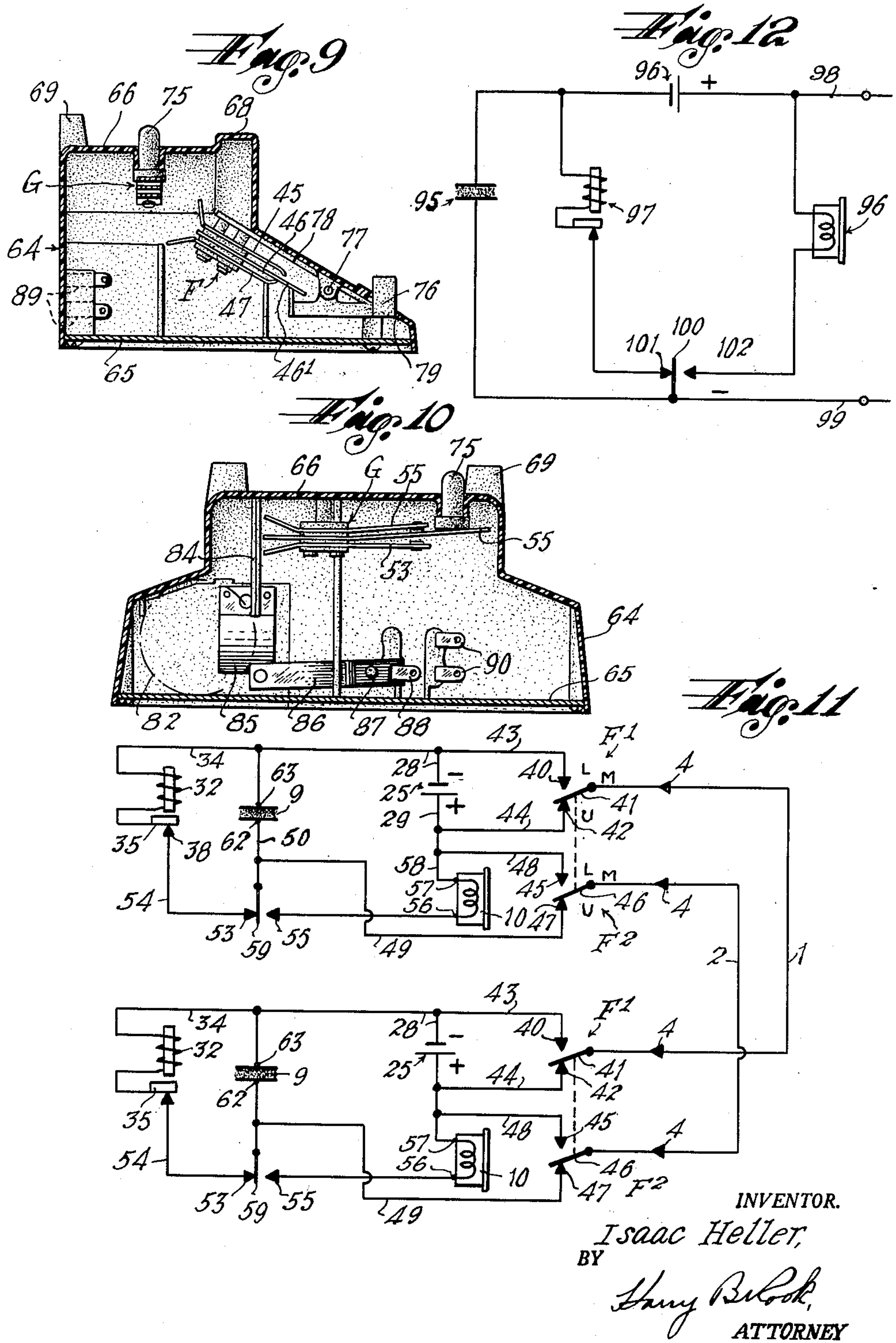
Figure 9 is a transverse vertical sectional view approximately on the plane of the line 9—9 of Figure 7 with the handset removed from the base and with the base in upright position.
Figure 10 is a view similar to Figure 8 taken on the plane of the line 10—10 of Figure 7 with the handset removed from the base.
Figure 11 is a wiring diagram of the circuit that is common to both the pair of handsets shown in Figures 1 to 5 inclusive and the system including the combined handsets and bases illustrated in Figures 6 to 10 inclusive.
Figure 12 is a wiring diagram of a modified circuit for one handset.

In normal non-operating condition, the handset of each combination or telephonic unit H and I rests upon the base and actuates the contact strip 59 of the talk switch G into no-talk position as shown in Figure 8, and the buzz switch F is in the normal condition as best shown in Figure 9. To make a call, the buzz switch lever 76 of the calling unit is depressed so as to actuate the buzz switch F and thereby cause energization of the buzzer in the called unit in the same way as described in connection with the form of the invention shown in Figures 1 to 4 inclusive. Then, for the purpose of conversation, both handsets must be lifted from their respective bases which releases the push buttons 75 of the talk switches of both phones as shown in Figure 10, so that the intermediate contact strips 59 of both switches will spring into position to establish the talking circuit and the push button will be raised upwardly as shown in Figure 10.

The wires 74¹, 74², 74³ and 74⁴ are the substantial equivalents of the wires that connect the buzz switch, talk switch and buzzer coil in circuit with the microphone and receiver in the handset of the phone of the invention shown in Figures 1 to 4 inclusive.

Preferably a sliding door 91 is mounted in the rear wall of each base to facilitate the insertion and removal of the batteries into and from the base.

It will be understood by those skilled in the art that instead of connecting the two handsets A and B together by the transmission lines, one handset A could be connected by the transmission lines to the base of, for example, the combination H of a handset and base.

A modified circuit is shown in Figure 12 which is a wiring diagram for one handset that may include a casing as hereinbefore described in which is housed a microphone 95, a receiver 96 and a buzzer 97 all of which may be identical with the respective microphones, receivers and buzzers of the form of the invention shown in Figures 1 to 4 inclusive, except that the impedances of the buzzer and receiver coils will be in the relation of 4 ohms and 2 ohms respectively. The batteries 96 of the two handsets will be so connected that when the sets are in normal non-operating condition, the potentials of the batteries will buck each other. The microphone 95 has its two terminals connected respectively to a transmission line wire 99 and one terminal of the battery, the other terminal of which is connected to transmission wire 98. The buzzer assembly and the receiver are connected in circuit with a switch that includes a movable contact element 100 and two stationary contacts 101 and 102. One terminal of the buzzer assembly is connected to the common junction of one battery terminal and one microphone terminal, while the other terminal of the buzzer assembly is connected to contact 101. The terminals of the receiver are connected respectively to transmission wire 98 and to the contact 102. Movable contact 100 is connected to transmission wire 99. When the movable contact 100 is in engagement with the contact 101 the telephone system is in non-operating condition and the potentials of the two batteries buck each other, while when the movable contact 100 is moved into engagement with the contact 102, the receiver of the calling phone is thrown across the transmission lines and the battery in the called handset will energize the buzzer in that handset. The movable contact 100 of the switches of both of the handsets normally will be positioned as shown in the drawing so as to connect the parallel combination of the buzzer coil and microphone in series with the battery across the two transmission line wires 98 and 99 and when the said movable contact 100 of the called handset is moved into engagement with its stationary contact 102, the talk circuit for both handsets will be established, and the buzzers in both handsets will be cut out of the circuit.

Circumlocution in the appended claims will be avoided by denoting each handset A and B of the system shown in Figure 1 and each combination H and I of a handset and a base shown in Figure 6, as a "telephonic unit."

While I have shown and described the now preferred embodiments of the invention, it will be understood that this is primarily for the purpose of illustrating the principles of the invention and that modifications and changes may be made in the structural details of the telephone systems within the spirit and scope of the invention.

What I claim is:

1. Telephonic apparatus comprising two telephonic units each including a microphone and a receiver, a power source having a positive terminal and a negative terminal, a buzzer having a coil with two terminals, an armature, and a buzzer contact, a two-wire transmission line, a buzzer switch including two movable contact elements and two fixed contact elements associated with each movable contact element, each said movable contact element of the buzzer switch of each unit being urged normally when the units are not in use into contact with one of its two fixed contact elements, a talk switch including a movable contact element and two fixed contact elements associated therewith, said movable contact element of the talk switch of each unit being urged normally when the units are not in use into engagement with one of its two fixed contact elements, and circuit wires connecting said microphone, receiver, power source, buzzer coil, buzzer contact in circuit with said buzzer switch contact elements, with said talk switch contact elements and with said transmission wires so that the potentials of the two power sources oppose each other when both said units are out of use, both of said movable buzzer contact elements of either unit being movable together out of contact with their first-mentioned fixed contact elements and into contact with their other fixed contact elements to connect the power sources of both units in series aiding each other and with the buzzer coil and buzzer contact of the other unit whereby the potentials of both power sources are combined to energize said buzzer coil of the second mentioned unit, said movable contact elements of the talk switches of both units when moved at the same time out of contact with their first-mentioned fixed contact elements and into contact with their outer fixed contact elements disconnecting the respective buzzer coils from the circuit and at the same time connecting the corresponding microphones in series with the corresponding power sources and receivers and also connecting the receivers of the two units in parallel through said transmission wires.

2. Telephonic apparatus comprising two telephonic units, each including a signal device comprising a direct current power source, a buzzer coil, an armature and a buzzer contact, a two-wire transmission line, a buzzer switch including two movable contact elements and two fixed contact elements associated with each movable contact element, each movable contact element being urged normally when the units are not in use into contact with one of said fixed contact elements, means for urging both of said movable contact elements simultaneously into contact with their other fixed contact elements and means connecting said movable contact elements, said fixed contact elements, said buzzer coil, said power source and said two transmission wires in circuit so that the potentials of said two power sources buck each other and no current flows while the units are not in use and when said movable contact elements of either unit are actuated out of contact with their first-mentioned fixed contact elements and into contact with their second-mentioned fixed contact elements the power sources of both units are connected in series with each other and with the buzzer coil and armature of the other unit, whereby the potentials of both power sources are combined to energize said buzzer coil.

3. Telephonic apparatus comprising two telephonic units and transmission wires between them, each including a signal device which comprises a direct current power source, a buzzer coil, an armature and a buzzer contact, a buzzer switch including contact elements at least one of which is movable, and conductors connecting said contact elements, said buzzer coil, said buzzer contact, said power source and said transmission wires in circuit so that, when the movable contacts of said units are in one position and the units are not in use, the potentials of the two power sources oppose each other and no current flows and when said movable contact of either unit is actuated out of its first-mentioned position and into another position, the power sources of both units are connected in series aiding each other and in series with the buzzer coil and the buzzer contact of the other unit, whereby the potentials of both power sources are combined to energize said buzzer coil.

4. Telephone apparatus as defined in claim 1 wherein each unit comprises a handset containing said microphone and said receiver, and a base containing said power source, said buzzer coil, said armature and buzzer contact, said buzzer switch, and said talk switch, and with the addition of a push button movably mounted in said base and moved in one direction by the handset on the base to actuate said movable contact of the talk switch into contact with the first-mentioned fixed contact, said movable contact being yieldingly urged into contact with the second-mentioned fixed contact when said hand-set is removed from the base, and a manually actuated member on said base to actuate both of said movable contacts of the buzzer switch out of contact with their first-mentioned fixed contacts and into contact with their second-mentioned fixed contacts.

5. Telephone apparatus as defined in claim 1 wherein each unit comprises a hand-set including a casing containing said microphone, said receiver, said power source, said buzzer coil, said armature and buzzer contact, said buzzer switch, and said talk switch, and with the addition of a push button movably mounted in said casing to actuate both of said movable contacts of the buzzer switch out of contact with their first-mentioned fixed contacts and into contact with their second-mentioned fixed contacts, and an actuating member movably mounted on said casing to actuate the movable contact element of the talk switch into contact with its second-mentioned fixed contact element.

6. Telephone apparatus as defined in claim 3, wherein each unit comprises a handset containing a microphone and a receiver, and a base containing said signal device, and with the addition of a manually actuated member on said base to actuate said movable contact element of said buzzer switch out of its first-mentioned position and into its second-mentioned position, a push button movably mounted on said base and actuated in one direction by the handset on said base; and a talk switch in said base including contact elements one of which is movable in opposite directions and actuated in one direction into one position by said push button when the handset is out of use on said base so that the potentials of the two power sources buck each other, thus allowing no current to flow and thereby conserving power, said contact elements of the talk switches of both units being connected to said conductors so that upon removal of the handset and resulting movement of said movable contact elements of the talk switches in the opposite direction into another position the respective buzzer coils are disconnected from the circuit and at the same time the corresponding microphones are connected in series with those corresponding power sources and receivers; and the receivers of the two units are connected in parallel through said transmission wires.

7. Telephone apparatus as defined in claim 3 wherein each telephonic unit comprises a handset which includes a casing containing a microphone, a receiver and said signal device, and with the addition of a manually actuated member movably mounted in said casing to actuate said movable contact element of said buzzer switch out of its first-mentioned position into its second-mentioned position, a talk switch in said casing including contact elements one of which is movable in opposite directions and when the units are not in use is urged in one direction into one position so that the potentials of the two power sources buck each other, thus allowing no current to flow and thereby conserving power, a manually operable member movably mounted on said casing to actuate said movable contact element in another direction into another position, said contact elements of the talk switches in both handsets being connected to said conductors so that upon movement of said movable contact elements of the talk switches into their second-mentioned position, the buzzer coils are disconnected from the circuit and at the same time the corresponding microphones are connected in series with the corresponding power sources and receivers, and the receivers of the two units are connected in parallel through said transmission wires.

8. Telephonic apparatus as defined in claim 1, wherein said two fixed contact elements for each movable contact element of the buzzer switch constitute a pair comprising a first and a second contact element at opposite sides of the corresponding movable contact element respectively, the second contact element of one pair and the first contact element of the other pair being connected together and to one terminal of the power source and to one terminal of the receiver, the second contact element of the first-mentioned pair being connected to the other terminal of the power source, to one terminal of the microphone and to one terminal of the buzzer coil while the second contact of the second-mentioned pair is connected to one terminal of the microphone and to the movable contact element of the talk switch, the two fixed contact elements of the talk switch being connected to the buzzer contact and to the other terminal of the receiver, respectively, each of said movable contact elements of said buzzer switch of each unit being connected to the corresponding movable contact of the buzzer switch of the other unit by one of said transmission wires and being normally urged into contact with their respective second fixed contact elements, and the movable contact element of the talk switch being normally urged into contact with its fixed contact element that is connected to the buzzer contact.

9. Telephonic apparatus including two telephonic units, each unit including a microphone and a receiver each of which has two terminals, a direct current power source having two terminals, a buzzer having a coil, an armature, and a buzzer contact, a switch including two fixed contact elements and a movable contact element, and two transmission wires, said microphone having one terminal connected to one transmission wire, said buzzer coil having one terminal connected to the other terminal of said microphone and its other terminal connected to said armature, said buzzer contact being connected to one of said fixed contact elements, said receiver having its terminals connected to the other transmission wire and to the other fixed contact element respectively, said movable contact element being connected to the transmission wire common to that to which said microphone is connected, said power source having one terminal connected to said common connection of the buzzer coil and the microphone, the other power source terminal connected to the common connection of the receiver and the transmission wire and thence to the terminal of like polarity of the power source in the other unit.

References Cited in the file of this patent

UNITED STATES PATENTS

| | | |
|---|---|---|
| 2,686,834 | Gottlieb | Aug. 17, 1934 |
| 2,686,835 | Gottlieb | Aug. 17, 1934 |